(12) United States Patent
Montejo Yuste et al.

(10) Patent No.: US 9,574,545 B2
(45) Date of Patent: Feb. 21, 2017

(54) CONNECTION SYSTEM FOR CONNECTING COMPONENT SECTIONS OF WIND TURBINE BLADES

(75) Inventors: Roberto Montejo Yuste, Pamplona (ES); Carlos Amezqueta Pueyo, Pamplona (ES); Francisco Lahuerata Calahorra, Pamplona (ES); Iñaki Nuin Martinez De Lagos, Pamplona (ES); Javier Guelbenzu Blasco, Pamplona (ES); Mercedes Sanz Millan, Pamplona (ES); Marcos Del Rio Carbajo, Pamplona (ES); Ana Belen Fariñas Castaño, Pamplona (ES); Ernesto Saenz More, Pamplona (ES)

(73) Assignee: INVESTIGACIONES Y DESARROLLOS EOLICOS S.L., Pamplona (Navarra) (ES)

( * ) Notice: Subject to any disclaimer, the term of this patent is extended or adjusted under 35 U.S.C. 154(b) by 633 days.

(21) Appl. No.: 14/117,479

(22) PCT Filed: May 3, 2012

(86) PCT No.: PCT/ES2012/000118
§ 371 (c)(1),
(2), (4) Date: Feb. 11, 2014

(87) PCT Pub. No.: WO2012/156547
PCT Pub. Date: Nov. 22, 2012

(65) Prior Publication Data
US 2014/0271210 A1    Sep. 18, 2014

(30) Foreign Application Priority Data
May 13, 2011    (ES) .................................. 201100527

(51) Int. Cl.
*F03D 1/06* (2006.01)
*F16B 5/00* (2006.01)

(52) U.S. Cl.
CPC ........... *F03D 1/0675* (2013.01); *F16B 5/0084* (2013.01); *F05B 2240/302* (2013.01); *F05B 2260/301* (2013.01); *Y02E 10/721* (2013.01)

(58) Field of Classification Search
CPC ..... F03D 1/0675; F16B 5/0004; F16B 5/0008; F16B 5/0024; F16B 5/0084; F16B 5/0088; F16B 5/0012; F16B 5/0016; F16B 5/02; F16B 5/0291; F16B 12/14; F16B 12/18; F05B 2240/302; F05B 2260/301
See application file for complete search history.

(56) References Cited

U.S. PATENT DOCUMENTS

| 2,133,146 A | * | 10/1938 | Larrecq | F01D 25/243 403/335 |
| 2003/0138290 A1 | * | 7/2003 | Wobben | B64C 27/46 403/293 |

(Continued)

FOREIGN PATENT DOCUMENTS

| EP | 1584817 A1 | 10/2005 |
| ES | 2352945 A1 | 2/2011 |
| WO | 2011006800 A1 | 1/2011 |

*Primary Examiner* — Christopher M Koehler
(74) *Attorney, Agent, or Firm* — Lucas & Mercanti, LLP

(57) ABSTRACT

The present invention relates to a connection system for connecting component sections of wind turbine blades, according to which one or more intermediate parts (2) formed by a complex structure defining end transverse partitions (2.1) and a central transverse partition (2.2), between which there extend columns (2.3) separated by openings (2.4), is arranged between the blade sections (1) to be connected, the openings (2.4) including short bolts or screws (3) that pass directly through the end transverse partitions (2.1) and long bolts or screws (3) that pass inside (Continued)

the columns (2.3), said bolts or screws (3) being screw-coupled to nut-like anchoring parts (4) housed in the material of the blade sections (1).

6 Claims, 7 Drawing Sheets

(56) References Cited

U.S. PATENT DOCUMENTS

| | | | |
|---|---|---|---|
| 2003/0205011 A1* | 11/2003 | Bequet | B64C 1/12 52/272 |
| 2008/0240925 A1* | 10/2008 | Kita et al. | F03D 1/0675 416/230 |
| 2009/0226320 A1* | 9/2009 | Torres Martinez | F03D 1/0675 416/204 R |
| 2010/0143148 A1* | 6/2010 | Chen | F03D 1/0675 416/241 R |
| 2012/0141287 A1* | 6/2012 | Hynum | F03D 1/0675 416/235 |

* cited by examiner

CONNECTION SYSTEM FOR CONNECTING COMPONENT SECTIONS OF WIND TURBINE BLADES

CROSS-REFERENCE TO RELATED APPLICATIONS

This application is a 371 of PCT/ES2012/000118 filed May 3, 2012, which in turn claims the priority of ES P201100527 filed May 13, 2011, the priority of both applications is hereby claimed and both applications are incorporated by reference herein.

TECHNICAL FIELD

The present invention relates to wind turbine blades which are made in sections to facilitate transport, proposing a system that allows advantageously defining the connection of the component sections of the blades.

STATE OF THE ART

The evolution of wind turbines into increasingly more powerful turbines has led to the blades thereof becoming considerably long, greatly complicating the transport thereof.

To solve that problem, making said blades in partial sections which are transported separately to the wind turbine assembly site, where said sections connected to form the blades assembled thereon, is now conventional.

Currently there are basic technologies for connecting component sections of wind turbine one of said technologies being based on bonded connections, while the other technology is based on mechanical connections.

Bonded connections require establishing installations with controlled humidity conditions, temperature conditions etc., such as those of manufacturing plants, at the wind turbine assembly site, and taking the machinery and the tools necessary for forming the bonded connection between component sections of the blades to said installations, making it very difficult to obtain effective and reliable connections by means of this technology.

Mechanical connections are based on using bolts or screws that are screw-coupled to nut-like elements fixed in the material for forming the sections of the blades or arranged in cavities of said material.

In that sense, one type of mechanical connection for connecting blade sections comprises a direct connection between the sections to be connected by means of bolts or screws that are screw-coupled at one end with respect to metal rods included in the composite material of one of the sections, passing said bolts or screws through facing longitudinal holes of the sections to be connected to a cavity defined in the other section, where through the other end of the bolts a nut or nut-like tightening element is incorporated. Solutions of this type can be found in documents WO2010081921, WO2007131937, US2010143148 and ES8503080, for example.

Another type of mechanical connection between blade sections comprises arranging one or several intermediate parts between the sections to be connected, said parts being fixed with threaded bolts on each of the sections being connected to one another. A solution of this type can be found in document WO2006056584, for example.

Another type of mechanical connection between blade sections comprises arranging respective metal parts fixed by means of various methods on the corresponding ends of the sections to be connected, a screwed fastening then being established between the two parts fixed to the sections being connected to one another. Solutions of this type can be found in documents WO2006103307, WO2011006800, ES2178903, ES2337645, EP2138715 and JP2004011616, for example.

The concentration of the distribution of fastening bolts or screws between the blade sections to be connected in any of these solutions is limited by geometric and structural reasons, such that in response to high load demands high concentrations of stresses are generated in each of the connection parts, so the risk of breaking is high.

OBJECT OF THE INVENTION

According to the present invention, a mechanical connection system for mechanically connecting sections of wind turbine blades is proposed, having particular structural features that make the connection advantageous with respect to known solutions in the state of the art.

This connection system object of the invention comprises one or several intermediate parts that are arranged between the blade sections cone connected, which blade sections are connected to said intermediate parts by means of bolts or screws that pass through longitudinal holes of the mentioned intermediate parts, establishing a screwed coupling with respect to nut-like anchoring parts housed inside the material of the blade sections, the intermediate parts having a complex structure formed by openings and columns defining respective end transverse partitions which are supported on the anchoring parts and a central transverse partition, through which there pass long bolts or screws that pass inside the columns from the central transverse partition and short bolts or screws that only pass through the end transverse partitions to the anchoring parts of the blade sections to be connected.

A system in which the connecting bolts or screws establish on the intermediate part or parts one pressure line at the edge and another pressure line in the central zone in relation to each of the blade sections to be connected is thus obtained, a predominant state of compression being generated in the intermediate part or parts that allows reducing the demands they must withstand.

The screwed couplings of bolts or screws for connecting the intermediate part or parts with the blade sections, on the anchoring parts housed in the material of the blade sections, are furthermore alternatively envisaged with two different lengths, whereby also achieving a distribution of the stresses resulting from fastening on the blade sections allowing strong connections with reduced localized stresses.

With all that, the proposed system has the following advantages:

As a result of the complex architecture of the intermediate part or parts of the connection, it is possible to have a large amount of bolts or screws in a smaller zone of the blade sections, which allows achieving a high load density (force withstood per unit of length) providing lightweight and very strong connections.

As a result of the complex architecture of the intermediate part or parts of the connection, it is possible to have a large amount of anchoring parts inside the material of the blade sections. The interface of said anchoring parts with the material of the blade sections is a critical point of the connection. As a result of the high number of interfaces, the demands withstood are very high, or if the demands are not excessive, smaller sized anchoring parts can be used, which enables choosing simple production systems and involves weight reductions in said anchoring parts and in the material around them.

Stresses affecting the intermediate part or parts are less than in other connection systems for one and the same acting external load as a result of the constructive architecture of said intermediate part or parts.

The connection system allows integrating various blade models with different internal architectures (such a single and two-spar contruction, box girder, etc.), without having a major impact on the overall design of the blade.

The assembly of the connection is possible from outside the blade formed with the sections being connected to one another, being able to act on the bolts or screws of the connection with the necessary tools through the openings of the intermediate part or parts, without the need for very restrictive assembly tolerances.

By means of using several intermediate, discrete and smaller sized connection parts, the manufacture, the assembly process and the adaptability thereof to curvatures of different blades are facilitated.

There is a smeller concentration of stresses in the material of the blade sections around the anchoring parts for anchoring the connection bolts or screws.

The neutral line or intermediate part or parts is perfectly aligned with the axis of the bolts or screws, the latter in turn being aligned with the neutral line of the wall of the blade sections being connected to one another, whereby secondary bending moments are not generated at the connection, which defines a very structurally effective connection.

The connection system, which will be covered with an aerodynamic fairing, does not project from the aerodynamic surface of the blade being formed, so the power produced by the blade is not affected.

Therefore, the proposed system has very advantageous features for its intended function, acquiring its own identity and a preferred character with respect to known systems having the same application.

DETAILED DESCRIPTION OF THE INVENTION

Figure 1:
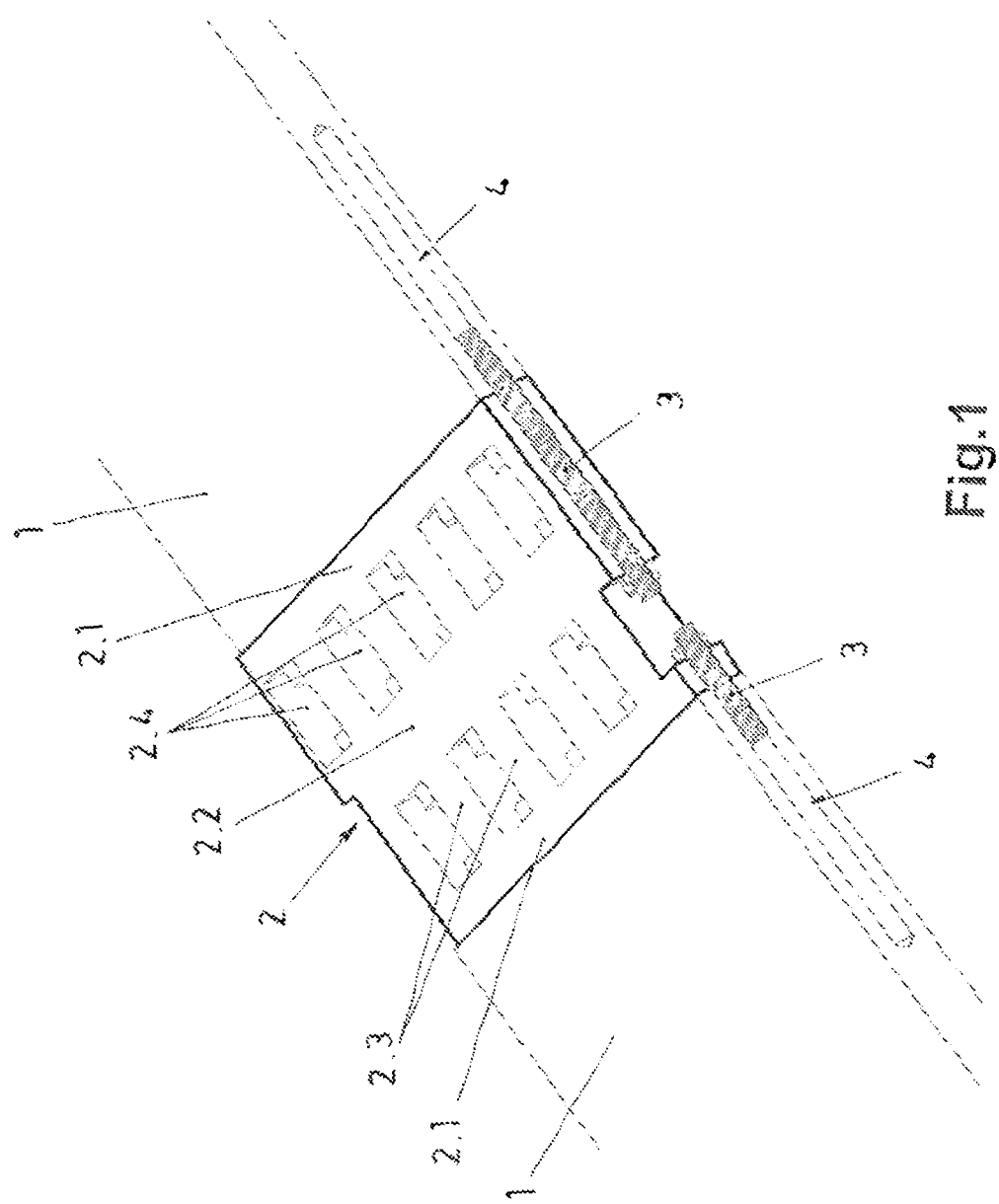
FIG. 1 shows a detail or a connection between two blade sections according to the system of the invention, with a single intermediate part.

The object or the invention relates to a connection system for connecting component sections (1) of wind turbine blades, a an embodiment providing advantageous constructive and functional features for that function.

The proposed system comprises one or several intermediate parts (2) that are arranged between the blade sections (1) to be connected, said intermediate parts (2) being fixed with respect to the end faces of the blade sections (1) on anchoring parts (4) by means of bolts or screws (3) that pass through longitudinal holes of the mentioned intermediate parts (2) and are screw-coupled with respect to the nut-like anchoring parts (4) housed in the blade sections (1).

The intermediate parts (2) that are arranged between the blade sections (1) to be connected are formed by a complex structure defining end transverse partitions (2.1) and a central transverse partition (2.2), between which there extend a series of columns (2.3) separated by openings (2.4).

The fixing bolts or screws (3) in said intermediate parts (2) for the fixing thereof on the blade sections (1) pass through the end transverse partitions (2.1) and through the central transverse partition (2.2), short bolts or screws (3) passing directly through the end transverse partitions (2.1) from the openings (2.4), whereas other long bolts or screws (3) pass through the central transverse partition (2.2) and from the latter inside the columns (2.3) until going through the corresponding end transverse partition (2.1).

A distribution of the fastening is thereby achieved, which allows arranging a large number of bolts or screws (3), with a distribution of the stresses resulting from the support on the end transverse partitions (2.1) and on the central transverse partition (2.2), a predominant state of compression being generated in the intermediate part or parts (2) that allows reducing the demands they must withstand, a very strong connection being obtained.

Figure 5:
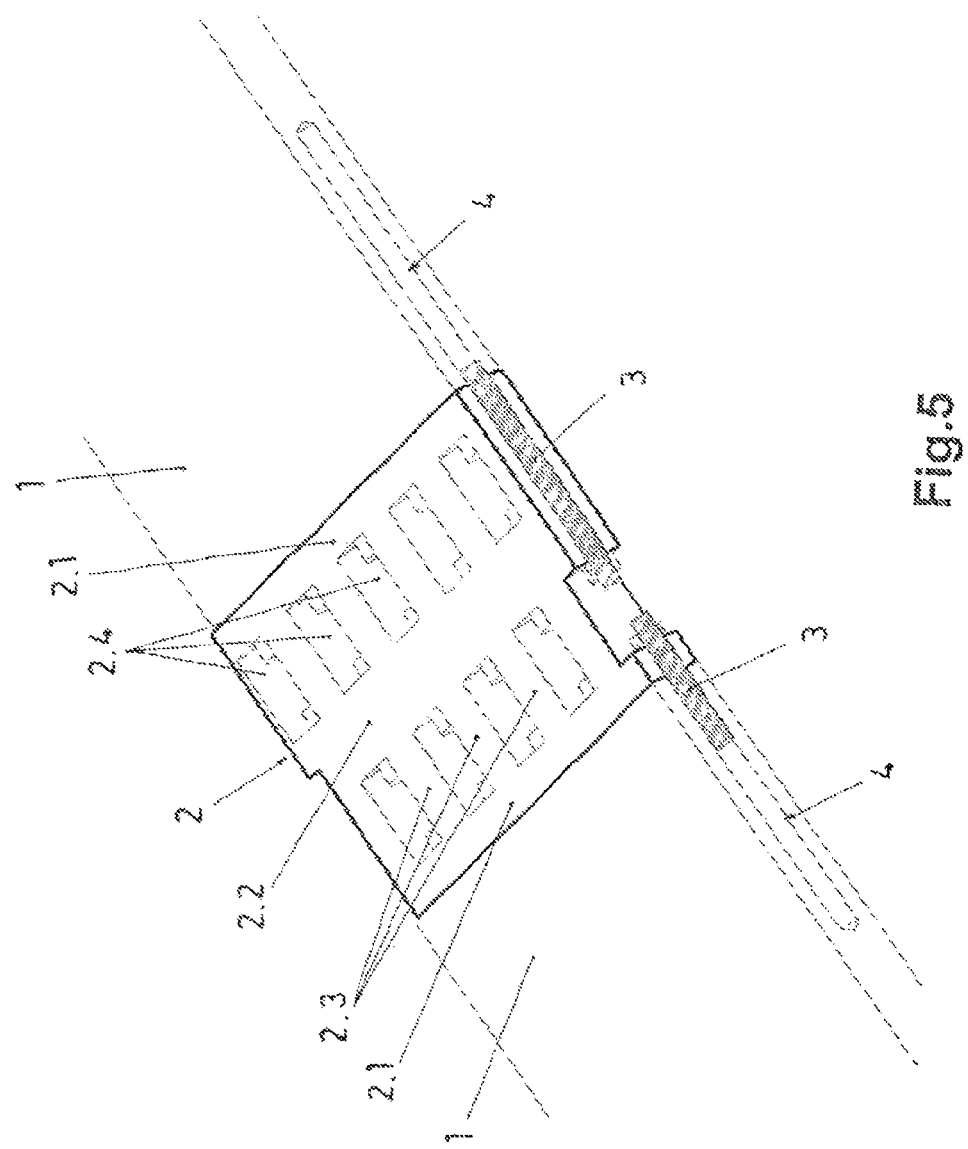
FIG. 5 is a detail similar to that of FIG. 1, with the bolts or screws for connecting the intermediate parts with respect to the blade or entering the blade sections with a distribution of two different lengths.

On the other hand, the screwed couplings of the bolts or sews (3) on the anchoring parts (4) housed in the material of the blade sections (1) are envisaged with two alternatively different lengths, for example, those that pass directly through the end transverse partitions (2.1) to a greater extent, and that of other bolts or screws (3), in this case those that pass inside the columns (2.3) to a lesser extent in the blade sections (1), as observed in FIG. 5, whereby a distribution of the stresses resulting from fastening on the blade sections (1) is also achieved, which means that the localized stresses therein are in turn reduced. The indicated distribution is not limiting, because likewise the bolts or screws (3) that pass directly through the end transverse partitions (2.1) could be those that penetrate the blade sections (1) to a lesser extent, and the bolts on screws (3) that pass inside the columns (2.3) could be those that penetrate same to a greater extent.

In those conditions, the connection the blade sections (1) can be defined with a single intermediate part (2), like in the embodiment of FIG. 1, that single part defining both the end transverse partitions (2.1) and the central transverse partition (2.2).

Figure 2:
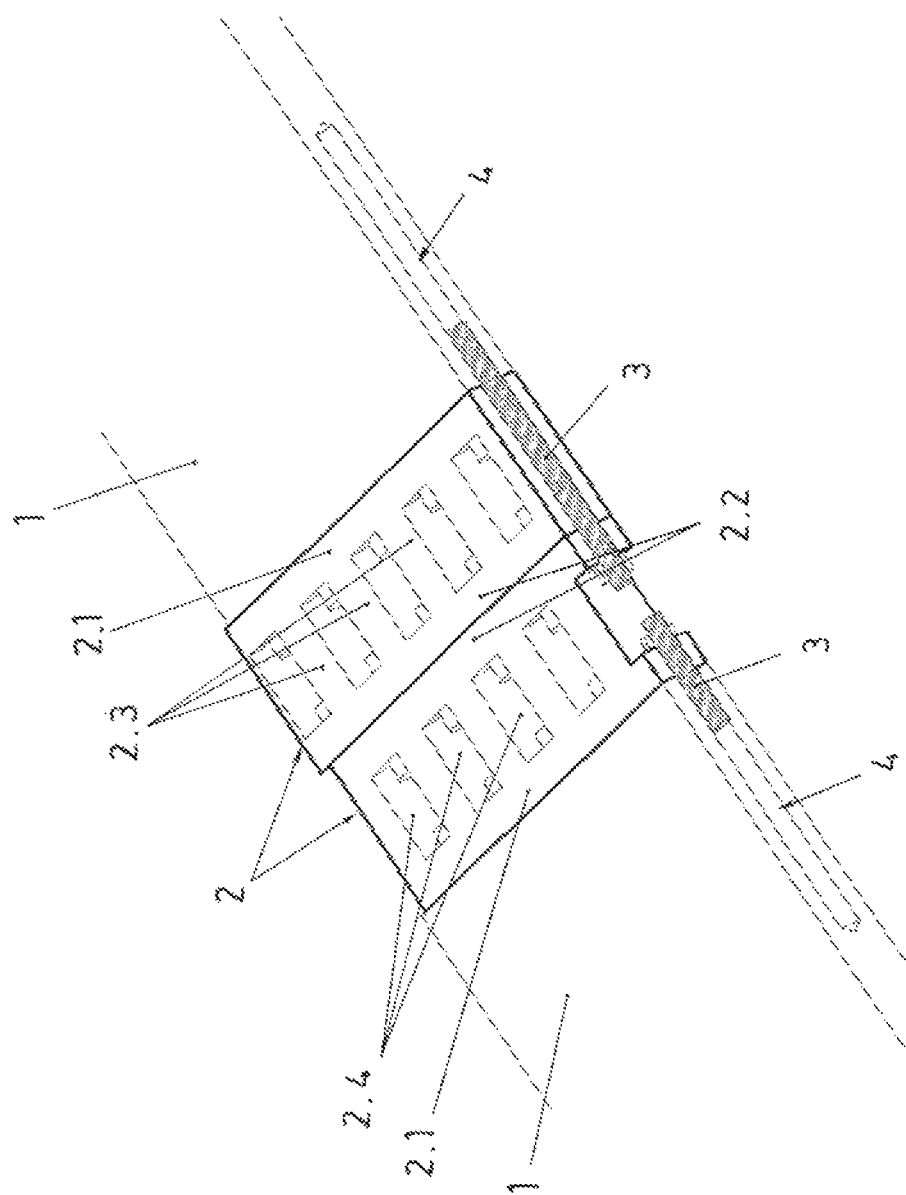
FIG. 2 is a detail like that of the previous figure, including the connection of two longitudinally placed complementary intermediate parts of the connection.

Nevertheless, the connection can likewise be defined with two longitudinally placed complementary intermediate parts (2), like in the embodiment of FIG. 2, each of said complementary parts defining an end transverse partition (2.1) and in the opposite portion another transverse partition which, together with the correlative transverse partition of the other complementary part, define the central transverse partition (2.2) of the connection.

Figure 3:
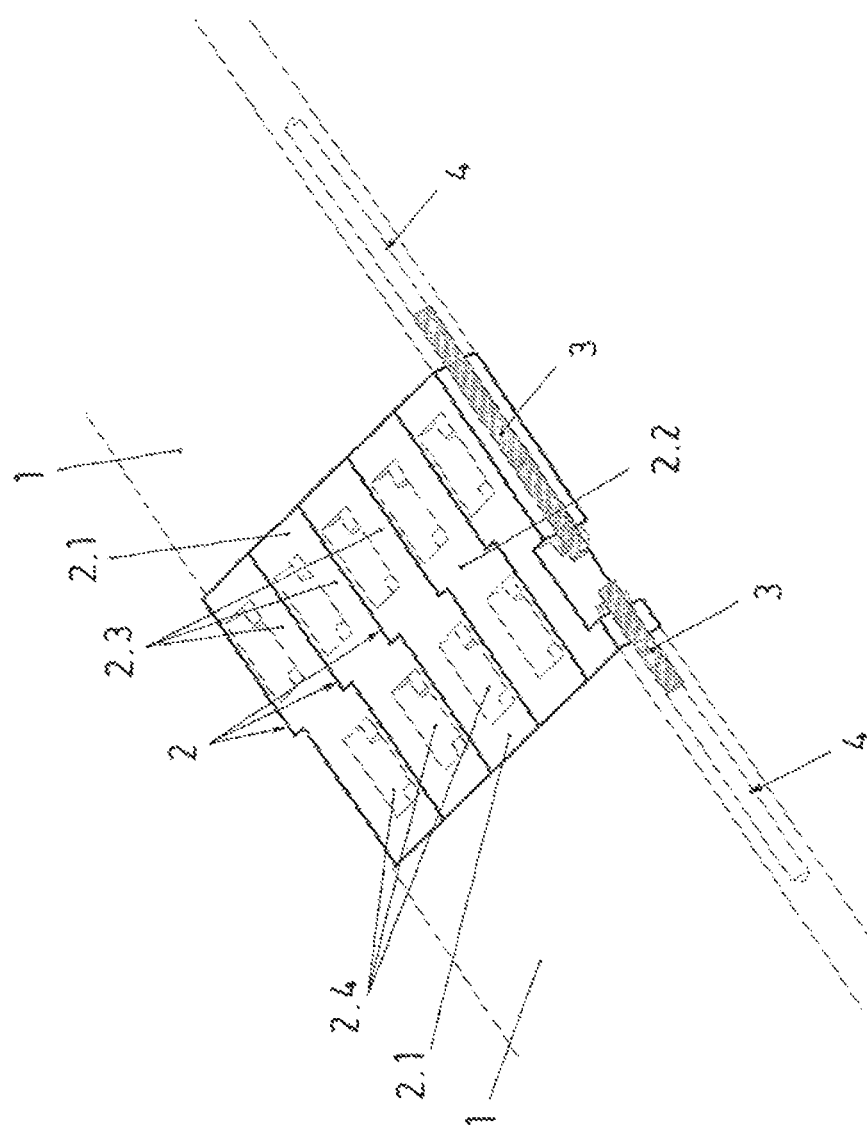
FIG. 3 is a detail similar to the previous ones, including the connection several transversely placed complementary intermediate parts of the connection, each of them comprising two openings, two short bolts or screws and two other long bolts or screws.
Figure 4:
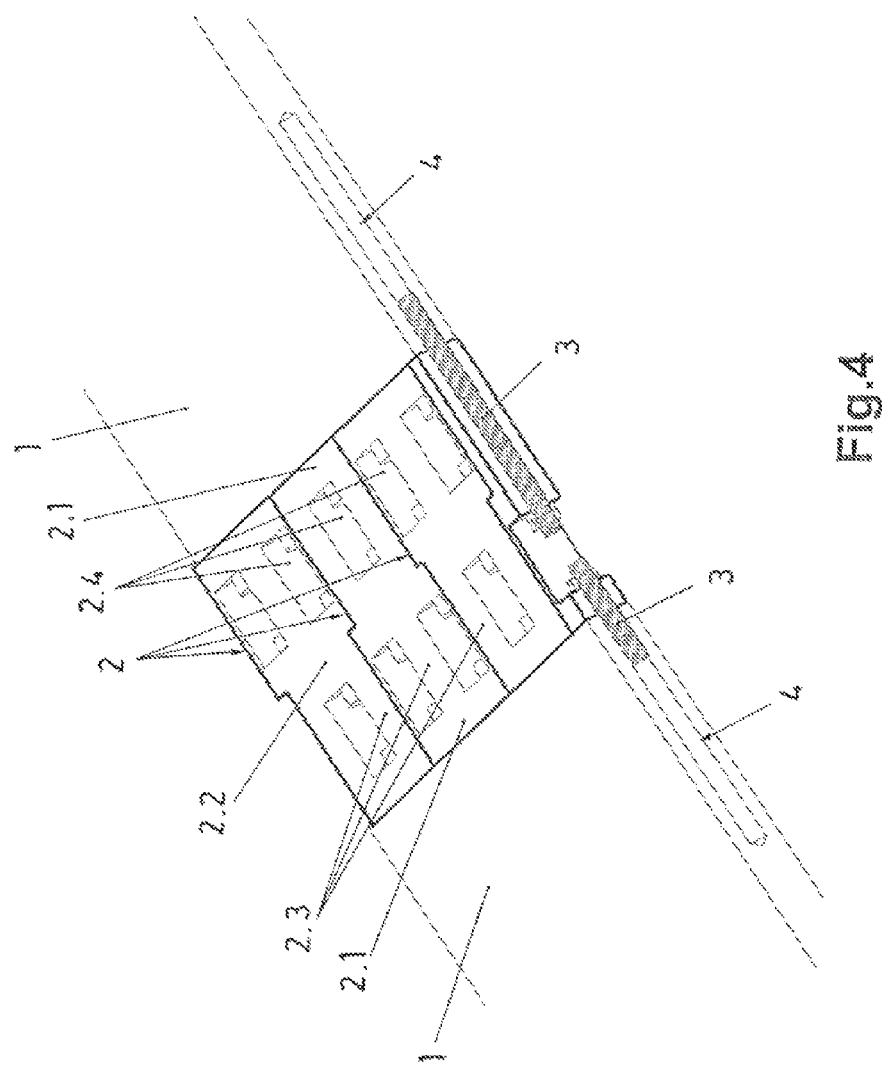
FIG. 4 is a detail like the previous one, with the transversely placed complementary intermediate parts of the connection, each of them alternatively comprising three openings, three short bolts or screws and three other long bolts or screws.

The connection can likewise be defined with transversely placed complementary intermediate parts (2), which can include groups of four or more bolts or screws (3), like in the embodiments of FIGS. 3 and 4, defining a similar effect for connecting two blade sections (1) by means of a complex intermediate structure in which a distribution of long bolts or screws (3) and a distribution of short bolts or screws (3) are arranged in each direction fixing on the blade sections (1) to be connected.

Figure 6:
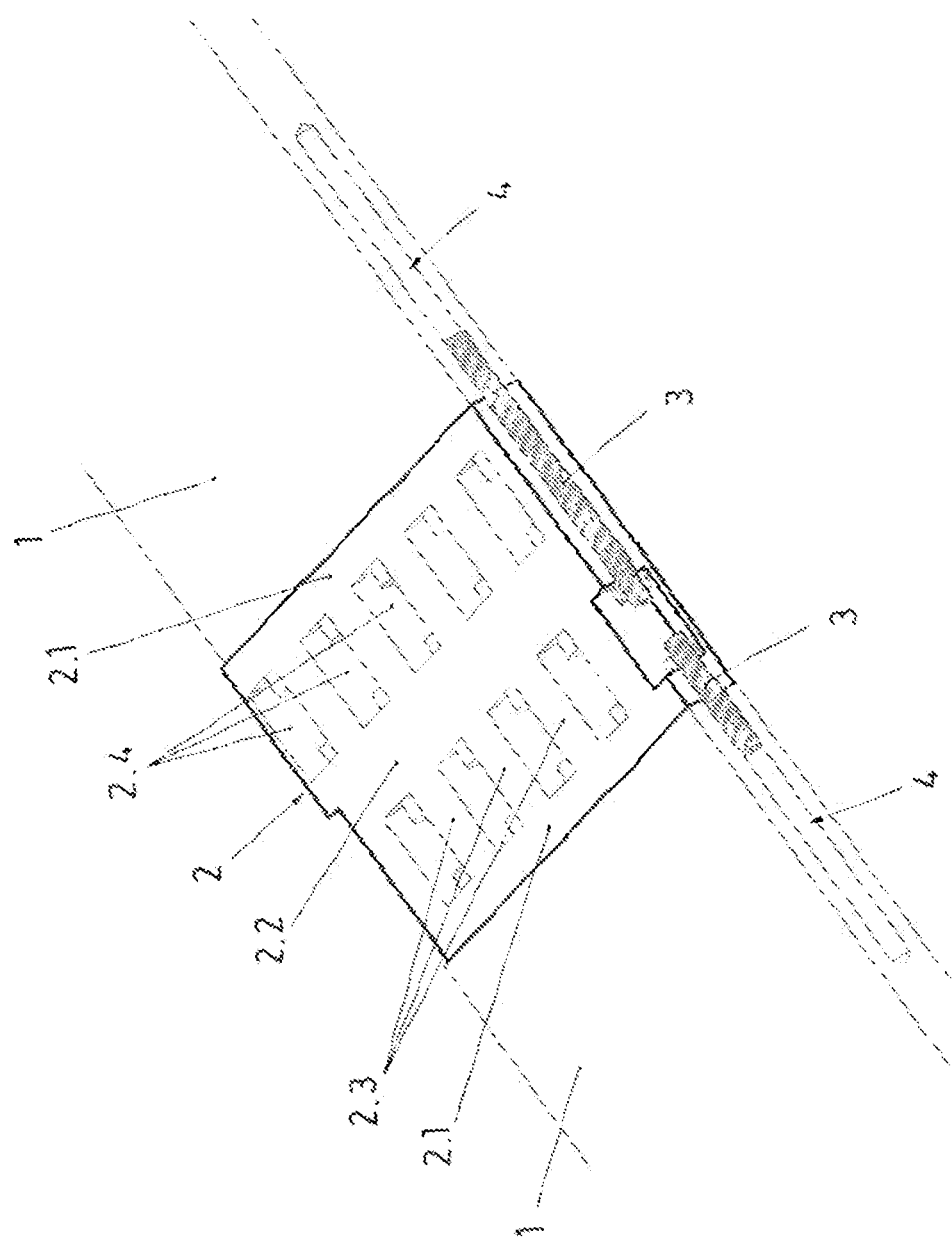
FIG. 6 is a detail similar to that of FIG. 1, with the intermediate part formed with blind openings in one of the faces of the part.

An embodiment of the intermediate part or parts (2) with blind openings (2.4) on one face of the corresponding part is also envisaged, like in the embodiment of FIG. 6, which thus allows defining a connection having a continuous surface, for example in the outer portion of the blade that is formed with the connected sections (1), and with cavities only in the inner face of the intermediate parts for introducing and tightening the bolts or screws (3) for the connection, or alternatively having the continuous surface in the inner portion of the blade.

Figure 7:
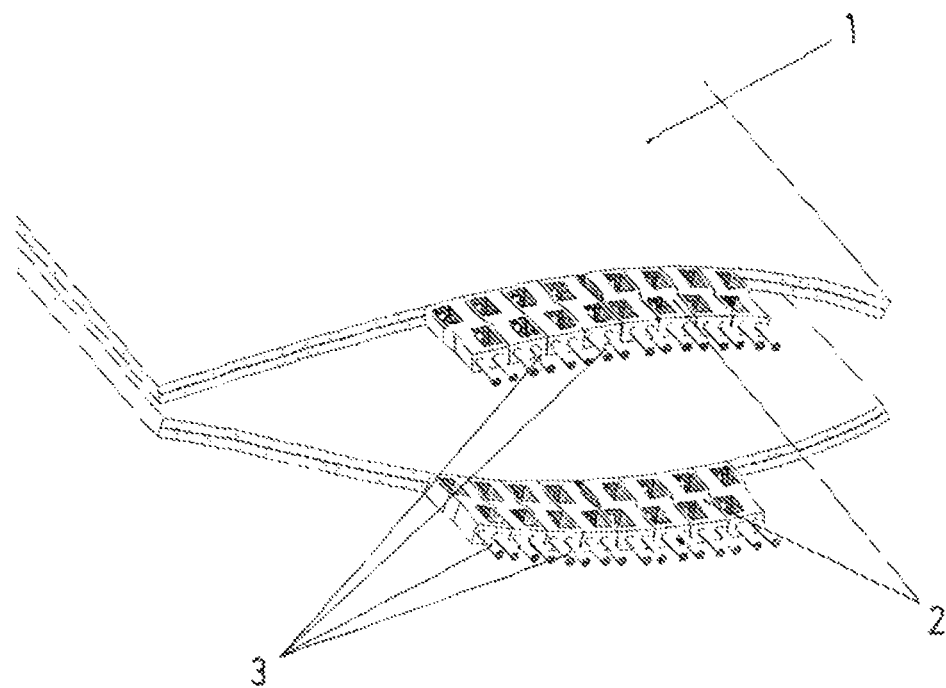
FIG. 7 is a detail of the end of a blade section, showing the position of the connection system in partial zones of outline of the profile of the section, corresponding with the zones of higher load transmission.

As observed in FIG. 7, the connection system by means of intermediate parts (2) can be applied, among others, in the central zone of the walls forming the profile of the blade sections (1), which is conventionally a structural zone that is stronger than the rest of the profile, such that the concentration of fastening bolts or screws (3) defining this system of the invention allows obtaining a connection of the blade sections (1) that is capable of withstanding the main stresses to which the blade that is formed with the connection is subjected.

This connection system can likewise be used for connecting blade sections (1) formed an internal structural frame in the form of a girder or box, or any other type of structure, the connection being able to be established in this case by arranging the intermediate parts (2) of the connection system between the internal structural frames of the blade sections (1).

In any case, the zone of the connection between the blade sections (1) as well as the rest of the outline of the profile of the blade corresponding with said zone of the connection are covered with a fairing to provide continuity to the aerodynamic surface of the blade between the connected sections (1).

The invention claimed is:

1. A connection system for connecting blade sections of a wind turbine blade, comprising at least one intermediate part fixed by bolts or screws on anchoring parts housed in the material of the blade sections to be connected, wherein the at least one intermediate part is disposed between the blade sections and is formed by a complex structure having a first end transverse partition, a second end transverse partition, and a central transverse partition between the first end transverse partition and the second end transverse partition, between the central transverse partition and each of the first end transverse partition and the second end transverse partition there extend a series of columns separated by openings, the openings between the central transverse partition and the first end transverse partition each including short bolts or screws that pass directly through the first end transverse partition and long bolts or screws that pass through the central transverse partition and from the latter inside one of the columns between the central transverse partition and the second end transverse partition until going through the second end transverse partition, and the openings between the central transverse partition and the second end transverse partition each including short bolts or screws that pass directly through the second end transverse partition and long bolts or screws that pass through the central transverse partition and from the latter inside one of the columns between the central transverse partition and the first end transverse partition until going through the first end transverse partition.

2. The connection system for connecting component sections of wind turbine blades according to claim 1, wherein the at least one intermediate part is only a single intermediate part defining the first end transverse partition, the second end transverse partition, and the central transverse partition.

3. The connection system for connecting component sections of wind turbine blades according to claim 1, wherein the at least one intermediate part includes two complementary intermediate parts arranged between the blade sections, one of the complementary intermediate parts having the first end transverse partition and in the opposite portion a further transverse partition and the other of the complementary intermediate parts having the second end transverse partition and in the opposite portion a further transverse partition, wherein the further transverse partitions of the complementary intermediate parts together define the central transverse partition.

4. The connection system for connecting component sections of wind turbine blades according to claim 1, wherein transversely placed complementary intermediate parts are arranged between the blade sections, each of the complementary intermediate parts including groups of four or more bolts or screws, and each of the complementary intermediate parts including a part of each of the first end transverse partition, the central transverse partition, and the second end transverse partition.

5. The connection system for connecting component sections of wind turbine blades according to claim 1, wherein screwed couplings of the bolts or screws on the anchoring parts housed in the material of the blade sections are of two different lengths.

6. The connection system for connecting component sections of wind turbine blades according to claim 1, wherein the openings are blind openings on one face of the corresponding intermediate part, which allows defining a connection having a continuous surface on the outside or inside between the blade sections being connected to one another.

* * * * *